March 14, 1967  E. MUTSCHLER ETAL  3,308,765
PUMP CONSTRUCTION
Filed May 21, 1965
2 Sheets-Sheet 1
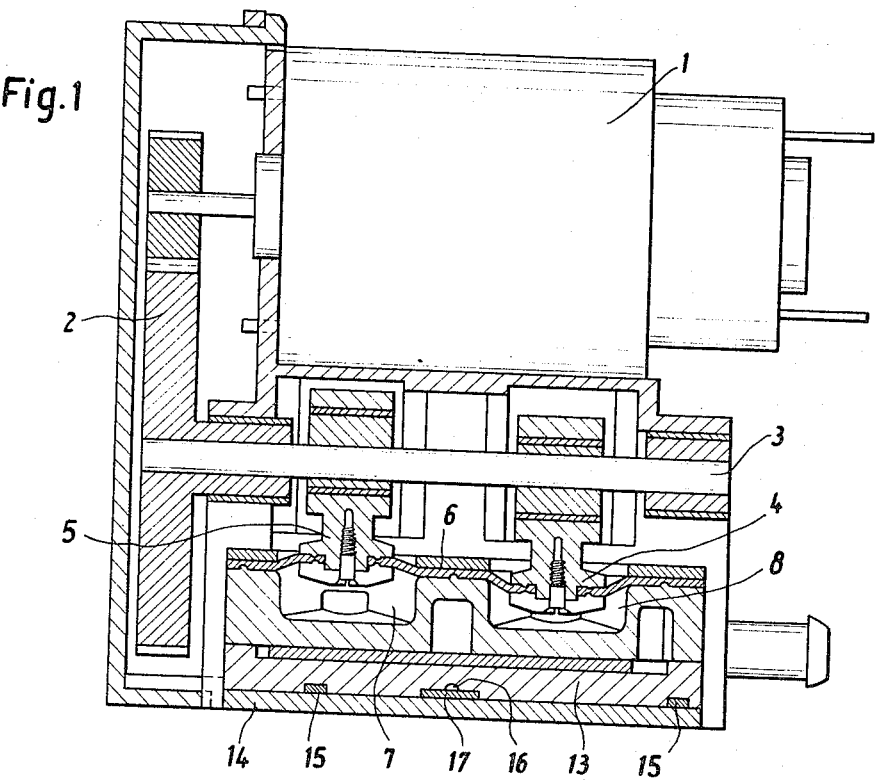
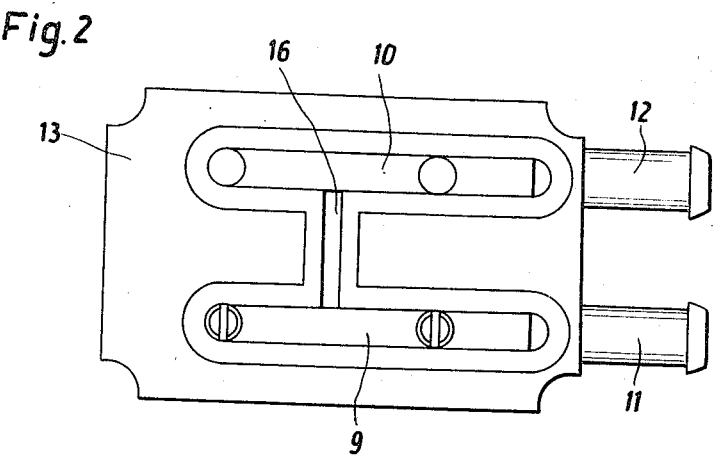
Inventors
ERICH MUTSCHLER
MICHAEL REIBL
BY Dicke + Craig
ATTORNEYS March 14, 1967  E. MUTSCHLER ETAL  3,308,765
PUMP CONSTRUCTION
Filed May 21, 1965  2 Sheets-Sheet 2

Inventors
ERICH MUTSCHLER
MICHAEL REIBL
BY Dicke + Craig
ATTORNEYS

_United States Patent Office_ 3,308,765
Patented Mar. 14, 1967

3,308,765
PUMP CONSTRUCTION
Erich Mutschler, Allensteiner Strasse 23, Bietigheim, Wurttemberg, Germany, and Michael Reibl, Holderlinstrasse 456, Ensingen, Kreis Vaihingen, Germany
Filed May 21, 1965, Ser. No. 457,630
Claims priority, application Germany, May 22, 1964, S 91,181
16 Claims. (Cl. 103—152)

The present invention relates to a diaphragm pump with built-in electric motor, especially as supply or booster pump for windshield wiper installations in motor vehicles, whereby the suction and pressure channels connected with the individual pump chambers are provided as preferably essentially parallelly disposed recesses in a plate-shaped structural element and terminate in connecting nipples provided thereon.

For windshield wiper installations, especially in motor vehicles, diaphragm or piston pumps are already known in which an electric drive motor is accommodated within a plastic housing which drives, by way of shock- and impact-damping force-transmitting elements, a crank shaft of the pump from which are controlled the individual diaphragm parts in the pump chambers. The pump chambers are thereby connected to the suction and pressure channels, and the latter lead to parallelly disposed connecting nipples of the pump. However, during operation of such types of diaphragm pumps, it has been found that a relatively high liquid pressure is produced. This pressure generally suffices to pull off in case of disturbances or faults in the system of the windshield wiper installation, for example, in case of a clogging of the nozzles, the elastic coupling and connecting lines from the respective connecting nipples. Hence, the problem existed to provide in such types of diaphragm pumps an excess pressure safety device, which leads, without any significant impairment of the pressure drop produced by the diaphragm pump under normal operating conditions thereof, to an excess pressure equalization upon the occurrence of disturbances or faults. Since such diaphragm pumps have to be manufactured as parts of the mass production involving low manufacturing costs and having small over-all dimensions in consideration of the installation thereof, there exists a requirement for as simple and as space-saving as possible a construction of the excess pressure safety device so that the arrangement of conventional ball or conical pressure equalization valves, which open against a spring force, are generally eliminated by reason of the costs connected therewith and the necessary space requirements thereof.

The present invention starts with the basic problem to create a diaphragm pump with built-in electric motor whose individual parts are suitable for a rational manufacture, preferably as plastic injection molded parts, and in which a safe excess pressure equalization can be achieved without substantial impairment of the differential pressure normally produced by the pump. The characteristic features of the present invention reside in that a pressure equalization channel, preferably adapted to be closed by a valve element, is provided within the plate-shaped structural element between the suction and pressure channels, whose flow resistance is a multiple of the flow resistance at the suction or pressure channel, whereby all of the channels are constructed as recesses of the plate-shaped structural element open at least on one side thereof and are closed off by means of a common cover plate, preferably sealed with respect thereto by sealing elements. With such a construction, the plate-shaped structural element provided with the recesses forming the suction, pressure, and pressure-equalization channels as well as the connecting nipples may be made as a unitary plastic injection-molded part whereby the recesses open on one side are sealed by a cover plate also made of plastic material, possibly by the interposition of a rubber-elastic annular seal. In the simplest construction, one can utilize exclusively the flow resistance of the pressure equalization channel and may dispense with the installation of a valve element. In this case, the interior depth of the pressure equalization channel may be selected approximately 0.1 mm. with a width corresponding to the pressure or suction channel. The suction and pressure channels are thereby arranged in the plate-shaped structural element according to a preferred construction of the present invention as parallel longitudinal slots whereby the pressure equalization channel is disposed perpendicularly to the suction and pressure channels.

The simplest construction having a valve-free pressure equalization channel achieves an extremely low construction and combines a simple assembly during installation with a relatively favorable manufacture as regards price, but requires an output loss of the pump which is effective also during normal operation of the pump. For purposes of avoiding this output loss during normal operation, a valve element is therefore appropriately arranged within the pressure equalization channel. A preferred embodiment in accordance with the present invention may be so constructed that the rubber-elastic diaphragm element is arranged in the pressure equalization channel within a curved recess which is pressed into sealing abutment by a similarly curved leaf-spring supported in the plate-shaped structural element and at the surfaces of the cover plate. Such a diaphragm-disc valve structure combines slight structural height with low manufacturing costs. It may thereby be appropriate to arrange the leaf spring, which presses the diaphragm element into abutment, essentially parallelly to the suction and pressure channels. The diaphragm element is appropriately constructed as rubber-disc whereby the leaf spring is provided with a semi-spherically shaped identation pointing toward the side of the plate-shaped structural element.

Further advantageous constructions of the general basic principle of the present invention may be so constructed and arranged that a rubber-elastic sealing element filling at least partially the cross section of the channel is inserted into the wall surfaces of the pressure equalization channel, or are provided with a corresponding elastic construction of the cover plate. In the former case, the rubber-elastic sealing element is compressed by the incompressible liquid in case of non-permissive pressure increase between suction and output side of the pump and frees a larger cross section of pressure equalization channel. In the case of the elastic cover plate, the latter bends open or flexes open in case of sufficient excess pressure for the pressure equalization between suction and pressure channel so that a direct overflow occurs between pressure and suction side.

Accordingly, it is an object of the present invention to provide a diaphragm pump with built-in electric motor of the type described above which is simple in construction, relatively inexpensive in manufacture and reliable in operation yet eliminates effectively the shortcomings and drawbacks encountered with the prior art constructions.

Another object of the present invention resides in the provision of a diaphragm pump which prevents the build-up of excess pressures between pressure and suction side in case of disturbances in the system without impairing the production of the desired pressure during normal operating conditions.

A further object of the present invention resides in the provision of a unitary-diaphragm pump for windshield wiper installations which prevents excess pressures in the pump output in case of clogging up of the spray nozzles of the installation.

A still further object of the present invention resides in the provision of a diaphragm pump of the type described above in which all parts may be manufactured in a simple and inexpensive manner and which can be readily assembled without excessive cost.

Another object of the present invention resides in the provision of a diaphragm pump of the type described above which effectively provides an excess pressure safety device without increasing the over-all dimensions and/or requiring an excessive number of costly parts.

Still another object of the present invention resides in the provision of a diaphragm pump for windshield wiper installations which prevents the build up of excessive pressures in the pump without the use of conventional, relatively large check valves.

These and further objects, features, and advantages of the present invention will become more obvious from the following description when taken in connection with the accompanying drawing which shows, for purposes of illustration only, two embodiments in accordance with the present invention, and wherein:

FIGURE 1 is a longitudinal cross-sectional view through a diaphragm pump in accordance with the present invention;

FIGURE 2 is a plan view on the plate-shaped structural elements of FIGURE 1 in accordance with the present invention which accommodates the various channels of the pump;

Figure 3:
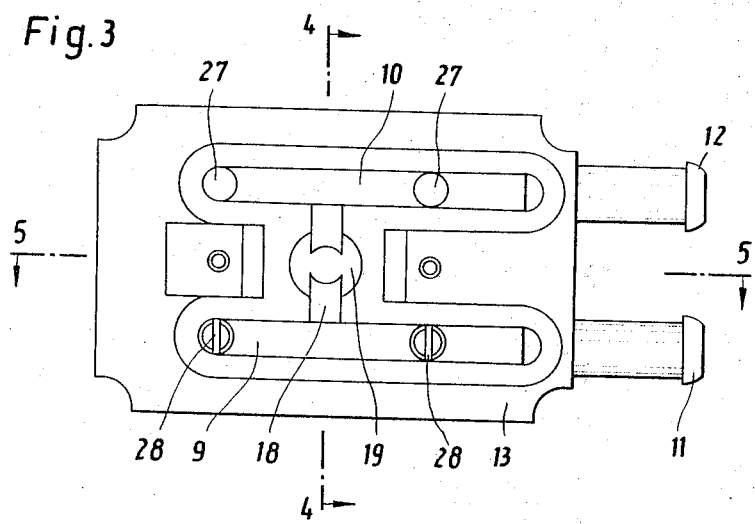
FIGURE 3 is a plan view, similar to FIGURE 2, on a modified embodiment of a plate-shaped structural element with valve means in accordance with the present invention.

Referring now to the drawing, wherein like reference numerals are used throughout the various views to designate like parts, and more particularly to FIGURE 1, reference numeral 1 designates therein a conventional electric drive motor which drives a crankshaft 3 by way of a gear drive 2. Piston parts 4 and 5 of the diaphragm pump are moved or displaced in opposite directions by the crankshaft 3. The piston parts 4 and 5 in conjunction with the diaphragm 6 and the associated conventional inlet and outlet valves produce a corresponding supply effect in the pump chambers 7 and 8. The pump chambers 7 and 8 are in communication with a pressure channel 9 and a suction channel 10 whereby the pressure channel 9 is connected with the connecting nipple 11 and the suction channel 10 with a further connecting nipple 12. (FIGURE 2.)

The pressure channel 9 and the suction channel 10 are accommodated as slot-shaped recesses in a plate-shaped structural element 13 which is closed off at its plane surface by means of a cover plate 14 with the interposition of rubber-elastic seals 15.

A pressure equalization channel 16 is provided between the suction channel 10 and the pressure channel 9; the pressure equalization channel 16 is covered in the direction toward the cover plate 14 by means of a rubber-elastic sealing strip 17. The cross section of the pressure equalization channel 16 is thereby selected so large that in case of excess pressure of the liquid a sufficient pressure equalization can take place.

Figure 4:
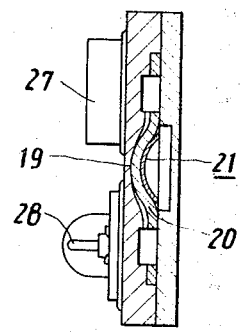
FIGURE 4 is a cross-sectional view taken along the line 4—4 of FIGURE 3.
Figure 5:
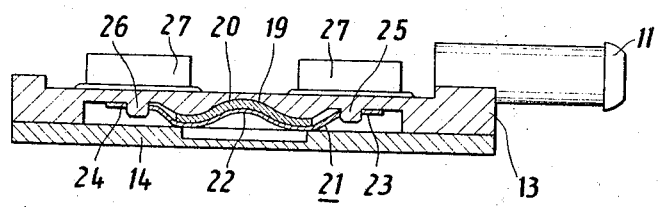
FIGURE 5 is a cross-sectional view taken along line 5—5 of FIGURE 3.

Whereas in the construction of FIGURES 1 and 2 only a pressure equalization channel 16, dimensioned correspondingly to its intended throttling effect, is provided without a specially constructed valve element, FIGURES 3 to 5 show the construction for a valve element particularly favorable for the instant structural unit. Also in this embodiment, slot-shaped recesses in the form of a pressure channel 9 and of a suction channel 10 are accommodated in the body of the plate-shaped structural element 13, whereby a pressure equalization channel 18, open on one side and formed by two portions, terminates at both inner ends thereof in a semi-spherically shaped recess 19 of the plate-shaped structural element 13. A diaphragm disc 20 (FIGS. 4 and 5) is pressed against this semi-spherically shaped recess 19. The abutment pressure is produced by a leaf spring 21 which is provided with a matched, complementary curved portion 22. The leaf spring 1 is inserted with the securing apertures 23 and 24 thereof in projections 25 and 26 of the plate-shaped structural element 13 and rests against this structural element 13 as well as at the inner surface of the cover plate 14. Outlet valves 27 as well as inlet valves 28 of conventional construction can be recognized on the surface of the plate-shaped structural element 13, which valves cooperate with the pump chambers 7 and 8.

In case of sufficient excess pressure between the inlet and outlet side of the pump, the diaphragm-disc 20 is lifted off against the force of the leaf spring 21 from its abutment at the hemisphericaly shaped recess 19, and a pressure equalization takes place with liquid overflowing between the pressure channel 9 and the suction channel 10.

The individual structural elements such as housing, plate-shaped structural element 13 and cover plate 14 as well as the motor supports are constructed appropriately as plasitc, injection-molded parts. By the use of the features of the present invention, diaphragm pumps with small dimensions can be manufactured in a relatively inexpensive manner in which also in case of faults or disturbances in the over-all installation, an adjusted permissive pressure value is not exceeded.

While we have shown and described two embodiments in accordance with the present invention, it is understood that the same is not limited thereto but is susceptible of numerous changes and modifications as known to a person skilled in the art, and therefore do not wish to be limited to the details shown and described herein, but intend to cover all such changes and modifications as are encompassed by the scope of the appended claims.

We claim:

1. A diaphragm pump with built-in electric motor, especially as supply pump for windshield wiper installations in motor vehicles, comprising:
pump means having pump chamber means, diaphragm means in said chamber means, piston means operatively connected with said diaphragm means, and electric drive means for driving said piston means, said pump means further including a plate-like structural element provided with suction and pressure channels which are operatively connected with the pump chamber means, and a pressure equalization channel provided in said plate-like structural element, said pressure equalization channel offering effectively a flow resistance which is a multiple of the flow resistance at one of the suction and pressure channels,
all of said channels being constituted by recesses in said plate-like structural element open at least on one side, and common cover plate means closing off said channel means.

2. A diaphragm pump with built-in electric motor, especially as supply pump for windshield wiper installations in motor vehicles, comprising:
pump means having pump chamber means, diaphragm means in said chamber means, piston means operatively connected with said diaphragm means, and electric drive means for driving said piston means, said pump means further including a plate-like structural element provided with substantially parallelly disposed suction and pressure channels which are operatively connected with the pump chamber means, and a pressure equalization channel provided in said plate-like structural element, said pressure equalization channel offering effectively a flow resistance which is a multiple of the flow resistance at one of the suction and pressure channels, all of said channels being constituted by recesses in said plate-like structural element open at least on one side, and common cover plate means closing off said channel means including sealing means.

3. A diaphragm pump with built-in electric motor, especially as supply pump for windshield wiper installations in motor vehicles, comprising:

pump means having pump chamber means, diaphragm means in said chamber means, piston means operatively connected with said diaphragm means, and electric drive means for driving said piston means, said pump means further including a plate-like structural element provided with susbtantially parallelly disposed suction and pressure channels which are operatively connected with the pump chamber means, and a pressure equalization channel provided in said plate-like structural element, said pressure equalization channel offering effectively a flow resistance which a multiple of the flow resistance at one of the suction and pressure channels, all of said channels being constituted by recesses in said plate-like structural element open at least on one side, and common cover plate means closing off said channel means including sealing means, said suction and pressure channels being constructed in said plate-like structural element as substantially parallel, longitudinal slots and said pressure equalization channel being arranged in said structural element substantially perpendicularly to the suction and pressure channels and being open on one side thereof.

4. A diaphragm pump with built-in electric motor, especially as supply pump for windshield wiper installations in motor vehicles, comprising:

pump means having pump chamber means, diaphragm means in said chamber means, piston means operatively connected with said diaphragm means, and electric drive means for driving said piston means, said pump means further including a plate-like structural element provided with suction and pressure channels which are operatively connected with the pump chamber means, and a pressure equalization channel provided in said plate-like structural element, said pressure equalization channel offering effectively a flow resistance which is a multiple of the flow resistance at one of the suction and pressure channels, all of said channels being constituted by recesses in said plate-like structural element open at least on one side, and common cover plate means closing off said channel means, and valve means for normally closing off said equalization pressure channel and operable to open up in case of a predetermined excess pressure, said valve means including elastic diaphragm means accommodated within a curved recess provided in said pressure equalization channel, and curved leaf spring means supported in the plate-like structural element and at the surface of the cover plate means for pressing said diaphragm means against the surface of the curved recess provided in said structural element.

5. A diaphragm pump with built-in motor, especially as supply pump for windsheld wiper installations in motor vehicles, comprising:

pump means having pump chamber means, diaphragm means in said chamber means, piston means operatively connected with said diaphragm means, and electric drive means for driving said piston means, said pump means further including a plate-like structural element provided with suction and pressure channels which are operatively connected with the pump chamber means, and a pressure equalization channel provided in said plate-like structural element, said pressure equalization channel offering effectively a flow resistance which is a multiple of the flow resistance at one of the suction and pressure channels, all of said channels being constituted by recesses in said plate-like structural element open at least on one side, and common cover plate means closing off said channel means, and valve means for normally closing off said equalization pressure channel and operable to open up in case of a predetermined excess pressure, said valve means including elastic diaphragm means accommodated within a curved recess provided in said pressure equalization channel, and curved leaf spring means supported in the plate-like structural element and at the surface of the cover plate means for pressing said diaphragm means against the surface of the curved recess provided in said structural element, said leaf spring means being arranged substantially parallel to the suction and pressure channels.

6. A diaphragm pump with built-in electric motor, especially as supply pump for windshield wiper installations in motor vehicles, comprising:

pump means having pump chamber means, diaphragm means in said chamber means, piston means operatively connected with said diaphragm means, and electric drive means for driving said piston means, said pump means further including a plate-like structural element provided with substantially parallelly disposed suction and pressure channels which are operatively connected with the pump chamber means, and a pressure equalization channel provided in said plate-like structural element, said pressure equalization channel offering effectively a flow resistance which is a multiple of the flow resistance at one of the suction and pressure channels, all of said channels being constituted by recesses in said plate-like structural element open at least on one side, and common cover plate means closing off said channel means including sealing means, said suction and pressure channels being constructed in said plate-like structural element as substantially parallel, longitudinal slots and said pressure equalization channel being arranged in said structural element substantially perpendicularly to the suction and pressure channel, and being open on one side thereof, and valve means for normally closing off said equalization pressure channel and operable to open up in case of a predetermined excess pressure, said valve means including elastic diaphragm means accommodated within a curved recess provided in said pressure equalization channel, and curved leaf spring means supported in the plate-like structural element and at the surface of the cover plate means for pressing said diaphragm means against the surface of the curved recess provided in said structural element.

7. A diaphragm pump with built-in electric motor, especially as supply pump for windshield wiper installations in motor vehicles, comprising:

pump means having pump chamber means, diaphragm means in said chamber means, piston means operatively connected with said diaphragm means, and electric drive means for driving said piston means, said pump means further including a plate-like strutural element provided with substantially parallelly disposed suction and pressure channels which are operatively connected with the pump chamber means, and a pressure equalization channel provided in said plate-like structural element, said pressure equalization channel offering effectively a flow resistance which is a multiple of the flow resistance at one of the suction and pressure channels, all of said channels being constituted by recesses in said plate-like structural element open at least on one side, and common cover plate means closing off said channel means including sealing means, said suction and pressure channels being constructed in said plate-like structural element as substantially parallel, longitudinal slots and said pressure equalization channel being arranged in said structural element substantially perpendicularly to the suction and pressure channel, and being open on one side thereof, and valve means for normally closing off said equalization pressure channel and operable to open up in case of a predetermined excess pressure, said valve means including elastic diaphragm means accommodated within a curved recess provided in said pressure equalization channel, and curved leaf spring means supported in the plate-like structural element and at the surface of the cover plate means for pressing said diaphragm means against the surface of the curved recess provided in said structural element, said leaf spring means being arranged substantially parallel to the suction and pressure channels.

8. A diaphragm pump with built-in electric motor, especially as supply pump for windshield wiper installations in motor vehicles, comprising:

pump means having pump chamber means, diaphragm means in said chamber means, piston means operatively connected with said diaphragm means, and electric drive means for driving said piston means, said pump means further including a plate-like structural element provided with suction and pressure channels which are operatively connected with the pump chamber means, and a pressure equalization channel provided in said plate-like structural element, said pressure equalization channel offering effectively a flow resistance which is a multiple of the flow resistance at one of the suction and pressure channels.

all of said channels being constituted by recesses in said plate-like structural element open at least on one side, and common cover plate means closing off said channel means, elastic sealing means inserted into the wall surfaces of the pressure equalization channel and filling the cross section of the equalization channel at least partly.

9. A diaphragm pump with built-in electric motor, especially as supply pump for windshield wiper installations in motor vehicles, comprising:

pump means having pump chamber means, diaphragm means in said chamber means, piston means operatively connected with said diaphragm means, and electric drive means for driving said piston means, said pump means further including a plate-like structural element provided with substantially parallelly disposed suction and pressure channels which are operatively connected with the pump chamber means, and a pressure equalization channel provided in said plate-like structural element, said pressure equalization channel offering effectively a flow resistance which is a multiple of the flow resistance at one of the suction and pressure channels.

all of said channels being constituted by recesses in said plate-like structural element open at least on one side, and common cover plate means closing off said channel means including sealing means, said suction and pressure channels being constructed in said plate-like structural element as substantially parallel, longitudinal slots and said pressure equalization channel being arranged in said structural element substantially perpendicularly to the suction and pressure channels and being open on one side thereof, and elastic sealing means inserted into the wall surfaces of the pressure equalization channel and filling the cross section of the equalization channel at least partly.

10. A diaphragm pump with built-in electric motor, especially as supply pump for windshield wiper installations in motor vehicles, comprising:

pump means having pump chamber means, diaphragm means in said chamber means, piston means operatively connected with said diaphragm means, and electric drive means for driving said piston means, said pump means further including a plate-like structural element provided with suction and pressure channels which are operatively connected with the pump chamber means, and a pressure equalization channel provided in said plate-like structural element, said pressure equalization channel offering effectively a flow resistance which is a multiple of the flow resistance at one of the suction and pressure channels, all of said channels being constituted by recesses in said plate-like structural element open at least on one side, and common cover plate means closing off said channel means, said cover plate means being made of elastic material.

11. A diaphragm pump with built-in electric motor, especially as supply pump for windshield wiper installations in motor vehicles, comprising:

pump means having pump chamber means, diaphragm means in said chamber means, piston means operatively connected with said diaphragm means, and electric drive means for driving said piston means, said pump means further including a plate-like structural element provided with substantially parallelly disposed suction and pressure channels which are operatively connected with the pump chamber means, and a pressure equalization channel provided in said plate-like structural element, said pressure equalization channel offering effectively a flow resistance which is a multiple of the flow resistance at one of the suction and pressure channels, all of said channels being constituted by recesses in said plate-like structural element open at least on one side, and common cover plate means closing off said channel means including sealing means, said suction and pressure channels being constructed in said plate-like structural element as substantially parallel, longitudinal slots and said pressure equalization channel being arranged in said structural element substantially perpendicularly to the suction and pressure channels and being open on one side thereof, said cover plate means being made of elastic material.

12. In a diaphragm pump especially as supply pump for windshield wiper installations in motor vehicles, having several pump chambers, diaphragm means in said chambers, and means operatively connected with said diaphragm means for actuating the same, the improvement essentially consisting of a plate-like structural element in said pump and provided with recess means forming suction and pressure channel means which are operatively connected with the pump chambers, and pressure equalization channel means in said plate-like structural element, said pressure equalization channel means having means effectively producing a flow resistance which is a multiple of the flow resistance at one of the suction and pressure channel means, all of said channel means being constituted by recess means in said plate-like structural element open at least on one side, and common cover plate means closing off said channel means.

13. In a diaphragm pump especially as supply pump for windshield wiper installations in motor vehicles, having several pump chambers, diaphragm means in said chambers and means operatively connected with said diaphragm means for actuating the same, the improvement essentially consisting of a plate-like structural element in said pump and provided with recess means forming suction and pressure channel means which are operatively connected with the pump chambers, and pressure equalization channel means in said plate-like structural element, said pressure equalization channel means having means effectively producing a flow resistance which is a multiple of the flow resistance at one of the suction and pressure channel means.

14. In a diaphragm pump especially as supply pump for windshield wiper installations in motor vehicles, having several pump chambers, diaphragm means in said chambers and means operatively connected with said diaphragm means for actuating the same, the improvement essentially consisting of a plate-like structural element in said pump and provided with recess means forming suction and pressure channel means which are operatively connected with the pump chambers, and pressure equalization channel means in said plate-like structural element, said pressure equalization channel means having means effectively producing a flow resistance which is a multiple of the flow resistance at one of the suction and pressure channel means, said means effectively producing the flow resistance including an elastic sealing element inserted into the wall surface of the pressure equalization channel means and filling at least partially the cross section of the channel means.

15. In a diaphragm pump especially as supply pump for windshield wiper installations in motor vehicles, having several pump chambers, diaphragm means in said chambers, and means operatively connected with said diaphragm means for actuating the same, the improvement essentially consisting of a plate-like structural element in said pump and provided with recess means forming suction and pressure channel means which are operatively connected with the pump chambers and pressure equalization channel means in said plate-like structural element, said pressure equalization channel means having means effectively producing a flow resistance which is a multiple of the flow resistance at one of the suction and pressure channel means, all of said channel means being constituted by recess means in said plate-like structural element open at least on one side, and common cover plate means closing off said channel means, said means effectively producing the flow resistance being constituted by said cover plate means which essentially consist of elastic material.

16. In a diaphragm pump especially as supply pump for windshield wiper installations in motor vehicles, having several pump chambers, diaphragm means in said chambers, and means operatively connected with said diaphragm means for actuating the same, the improvement essentially consisting of a plate-like structural element in said pump and provided with recess means forming suction and pressure channel means which are operatively connected with the pump chambers, and pressure equalization channel means in said plate-like structural element, said pressure equalization channel means having means effectively producing a flow resistance which is a multiple of the flow resistance at one of the suction and pressure channel means, said means effectively producing the flow resistance being constituted by the throttling cross section of said equalization channel means which forms a cross sectional area about equal to 0.1 times the width of one of the suction and pressure channels, where the width is expressed in millimeters.

References Cited by the Examiner

UNITED STATES PATENTS

| | | | |
|---|---|---|---|
| 862,867 | 8/1907 | Eggleston | 230—50 |
| 2,415,060 | 1/1949 | Craig | 230—22 |
| 2,520,674 | 8/1950 | Buschmann | 103—4 X |
| 2,650,545 | 9/1953 | Cornelius | 103—150 |

ROBERT M. WALKER, *Primary Examiner.*